United States Patent [19]

Rushing

[11] Patent Number: 4,620,731
[45] Date of Patent: Nov. 4, 1986

[54] APPARATUS FOR SEALING PIPE FLANGES
[76] Inventor: Bendel S. Rushing, 9426 Bankside, Houston, Tex. 77031
[21] Appl. No.: 761,461
[22] Filed: Aug. 1, 1985
[51] Int. Cl.⁴ .............................................. F16L 23/00
[52] U.S. Cl. ...................................... 285/363; 285/15; 285/368; 285/405
[58] Field of Search ................ 285/363, 15, 405, 368, 285/412

[56] References Cited
U.S. PATENT DOCUMENTS
1,356,404 10/1920 Robinson ..................... 285/363 X
3,912,307 10/1975 Totman ........................ 285/405 X FOREIGN PATENT DOCUMENTS
37912 3/1979 Japan ............................ 285/363

Primary Examiner—Richard J. Scanlan, Jr.
Attorney, Agent, or Firm—Fulbright & Jaworski

[57] ABSTRACT

An apparatus for sealing a pair of circularly coacting pipe flanges which includes a seal around the outer periphery of both the flanges for sealing the outer periphery and a bolt having a coacting nut extending through the bolt holes of the flange. A first sealing ferrule is positioned between the bolt head and one flange and a second sealing ferrule is positioned between the nut and the other flange. The ferrules include a conical exterior surface tapering inwardly and extending into the bolt holes for preventing the escape of fluid through the bolt holes. Each head and first ferrule and each nut and second ferrule include coacting tapered surfaces for pressing the ferrules into a sealing relationship with the bolt and flanges.

1 Claim, 2 Drawing Figures

APPARATUS FOR SEALING PIPE FLANGES

BACKGROUND OF THE INVENTION

Pipe flanges are generally tightened together by nuts and bolts with a seal between coacting flanges for sealing off the connection between the flanges. However, such seals sometimes leak, and it is frequently not possible nor economically feasible to shut down the pipeline for repairing the leak. Therefore, it is conventional to temporarily seal the leaking flange until the pipeline can be conveniently repaired. One method of repairing a flange is to weld a ring around a leaking flange and then a plastic material such as epoxy is injected between the flanges which hardens and stops any leaks. However, this particular sealing method causes extensive cleanup and generally adheres to the flanges and equipment that was leaking so that it is impractical to repair the flanges, but instead they must be replaced.

The present invention is directed to an apparatus for sealing a pair of coacting pipe flanges which will not ruin the flanges, cause extensive cleanup, or complicated repair and replacement procedures.

SUMMARY

The present invention is directed to an apparatus for sealing a pair of coacting pipe flanges which are normally secured together by a plurality of bolts and nuts extending through bolt holes in the flanges. The apparatus includes sealing means connected to and extending around the outer periphery of both of said flanges for sealing the outer periphery of the flanges. The bolt holes are then sealed by having a bolt with coacting nuts which bolt extends through each of the bolt holes. A first sealing ferrule is positioned about each bolt between a first nut and the bolt hole for sealing, and a second sealing ferrule is positioned about each bolt between a second nut and the bolt hole for sealing. The first and second ferrules include a conical exterior surface tapering inwardly and extending into the bolt hole for preventing the escape of fluids, such as liquids or gases, through the bolt hole.

Still a further object of the present invention is wherein each first nut and first ferrule includes coacting tapered surfaces for pressing the first ferrule into a sealing relationship with the first nut, bolt and adjacent flange. And each second nut and second ferrule includes coacting tapered surfaces for pressing the second ferrules into a sealing relationship with the second nut, bolt and adjacent flange.

Still a further object of the present invention is wherein the coacting tapered surfaces between the first ferrules and the first nuts and the coacting tapered surfaces between the second ferrules and the second nuts taper outwardly from the bolt towards the flanges.

Yet a further object of the present invention is wherein the ferrules are of a metal softer than the flanges.

Other and further objects, features and advantages will be apparent from the following description of a presently preferred embodiment of the invention, given for the purpose of disclosure and taken in conjunction with the accompanying drawings.

DESCRIPTION OF THE PREFERRED EMBODIMENT

The present invention will be described in connection with temporarily repairing a leaking flange connection.

Figure 1:
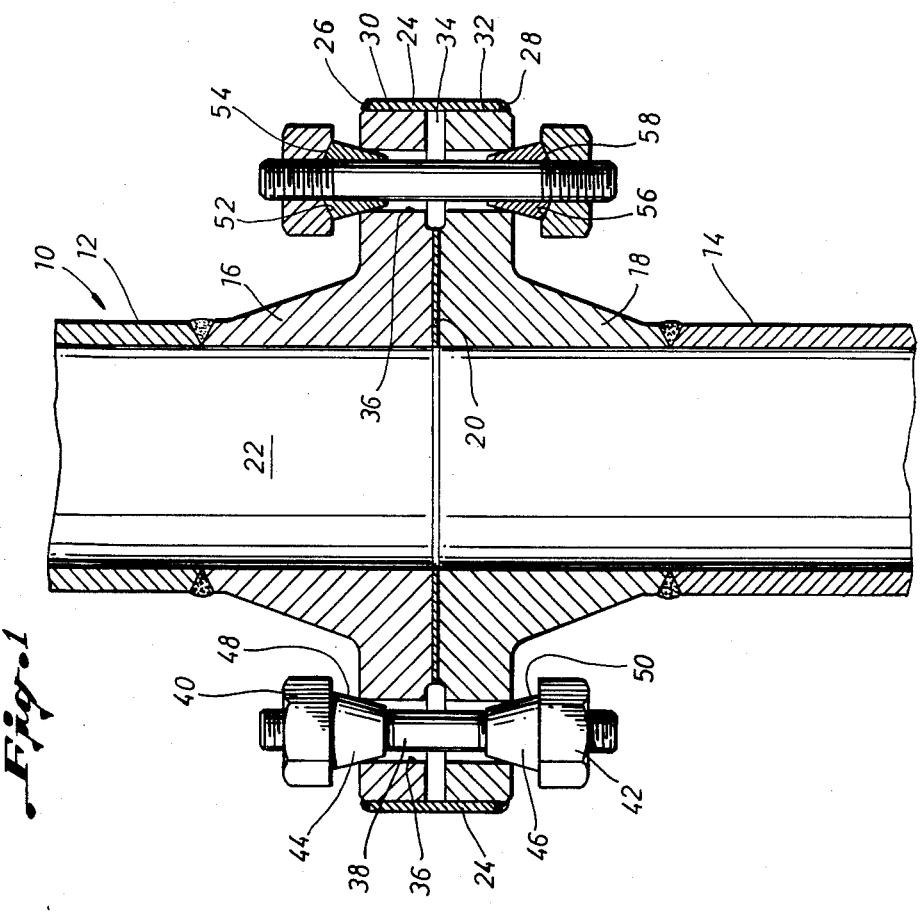
FIG. 1 is an elevational view partly in cross section illustrating the apparatus of the present invention for sealing coacting pipe flanges.

Referring now to the drawing and particularly to FIG. 1, the reference numeral 10 generally indicates a pipeline having first and second pipes 12 and 14, each connected to a pipe flange 16 and 18, respectively. The flanges 16 and 18 are circular coacting pipe flanges which are normally secured together by a plurality of bolts and nuts in which the bolts extend through bolt holes in the flanges 16 and 18. A suitable seal 20 is provided between the flanges 16 and 18 for preventing leakage of fluids in the interior 22 of the pipeline out between the interface between the flanges 16 and 18.

However, the seal 20 may sometimes fail in which case the fluid on the inside of the pipeline 10 will leak and escape between the flanges 16 and 18. The present invention is directed to an apparatus for sealing the flanges 16 and 18 to enclose and stop any leaks that may occur even though the seal 20 fails.

A metal ring 24 is welded on each side by welds 26 and 28 connected to and extending around the outer peripheries 30 and 32 of the flanges 16 and 18, respectively, for preventing any leaking fluid from escaping from the peripheries. Other types of sealing means may be connected to the outer peripheries 30 and 32 for sealing the space 34.

With the sealing means 24 attached, any leaks from the seal 20 will still flow out of the bolt holes 36. The conventional bolts and nuts which are normally positioned in the bolt holes 36 for securing the flanges 16 and 18 are removed, preferably one bolt at a time and replaced with a sealing apparatus of the present invention. Thus, a special bolt 38 having a first nut 40 and a second nut 42 are provided with the bolt 38 extending through each of the bolt holes 36. A first sealing ferrule 44 is positioned about each bolt 38 between the first nut 40 and the bolt hole 36 for sealing. A second sealing ferrule 46 is positioned about each bolt 38 between the second nut 42 and the bolt hole 36 for sealing. The ferrules 44 and 46 include a conical exterior surface 48 and 50, respectively, tapering inwardly and extending into the bolt hole 36 for preventing the escape of fluid through the bolt hole 36. When the nuts 40 and 42 are tightened on the bolts 38, the ferrules will provide a metal-to-metal seal sealing against the nut 40, the nut 42, the bolt hole 36, and the bolt 38.

Preferably, each nut 40 and first ferrule 44 include coacting tapered surfaces 52 and 54, respectively. The coacting tapered surfaces 52 and 54 taper outwardly from the bolts 38 toward the flange 16 for pressing the first ferrule 44 into a sealing relationship with the nut 40, the bolt 38, and the flange 16. Similarly, each nut 42 and second ferrule 46 include coacting tapered surfaces 56 and 58, respectively. The tapered surfaces 56 and 58 taper outwardly from the bolt 38 towards the flange 18 for providing a sealing relationship of the second ferrule 46 with the nut 42, the bolt 38, and the flange 18. While the ferrules may be of different types of materials, either harder or softer than the flanges, preferably they are of a metal softer than the flanges 16 and 18 which are generally steel. One suitable type of material for the ferrules 44 and 46 is brass which is easily deformable but which provides a good metal-to-metal seal against the bolts 38, the nut 40, the nut 42, and the flanges 16 and 18. In one test, the present invention withstood a pressure of 19,500 pounds without leaking.

Figure 2:
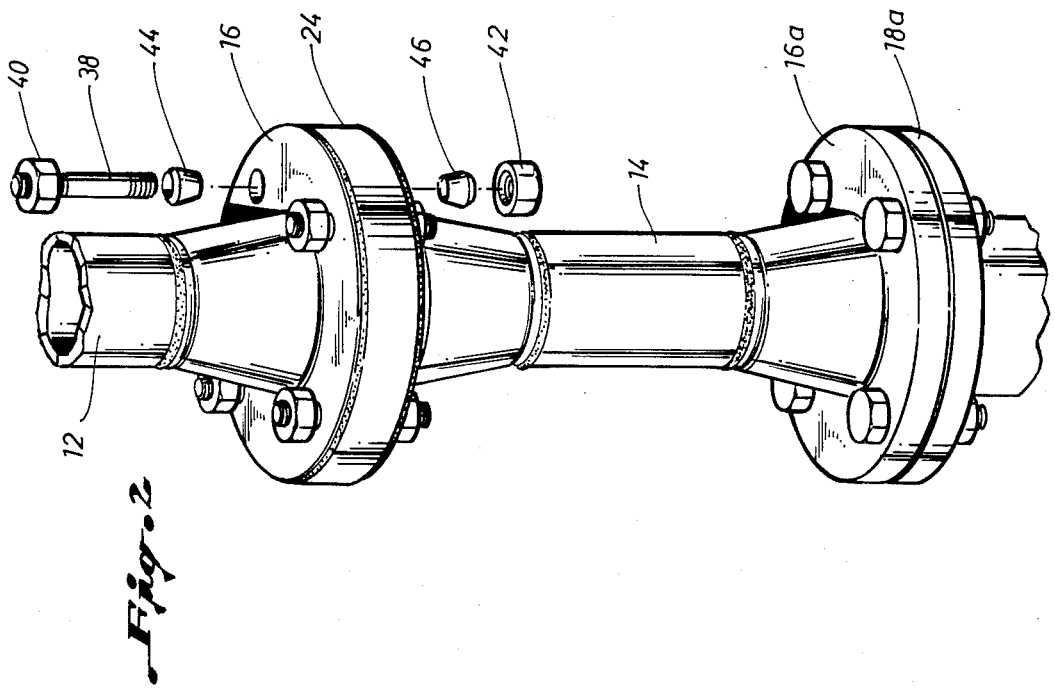
FIG. 2 is an isometric elevational view of a pipeline with two sets of flanges in which one set of flanges is being sealed according to the present invention.

FIG. 2 shows the invention of the present invention being applied to flanges 16 and 18. A conventional flange 16*a* and 18*a* are shown which are not leaking and therefore do not require the present invention.

When it is convenient to shut down the pipeline 10 and repair the seal 20, the welded plate 24 is removed along with bolts 38 and nuts 42 and ferrules 44 and 46. Conventional nuts and bolts are then used after the seal 20 is replaced. Therefore, the present invention provides a temporary but secure seal, but allows the reuse of flanges 16 and 18.

The present, therefore, is well adapted to carry out the objects and attain the ends and advantages mentioned as well as others inherent therein. While a presently preferred embodiment of the invention has been given for the purpose of disclosure, numerous changes in the details of construction and arrangement of parts may be made without departing from the spirit of the invention and the scope of the appended claims.

What is claimed is:

1. An apparatus for sealing a pair of circular coacting pipe flanges which are normally secured together by a plurality of bolts and nuts extending through bolt holes in the flanges comprising, sealing means connected to and extending around the outer periphery of both of said flanges for sealing the outer periphery of said flanges, a bolt having threaded portions at each end and an unthreaded portion between the threaded portions, and having a coacting first and second nuts connected to the threaded portions, and extending through each of the bolt holes, a first sealing ferrule positioned about each bolt between the first nut and the bolt hole and engaging the unthreaded portion of the bolt for sealing, a second sealing ferrule positioned about each bolt between the second nut and the bolt hole for engaging the unthreaded portion of the bolt for sealing, said ferrules including a conical exterior surface tapering inwardly and extending into the hole for preventing the escape of fluids through the bolt holes, each first nut and first ferrule including coacting tapered surfaces for pressing the first ferrules into a sealing relationship with the first nut, bolt and adjacent flange, each second nut and second ferrule incuding coacting tapered surfaces for pressing the second ferrules into a sealing relationship with the second nut, bolt and adjacent flange, the coacting tapered surfaces between the first ferrules and the first nuts and the coacting tapered surfaces between the second ferrules and the second nuts taper outwardly from the bolts toward the flanges.

* * * * *